(12) United States Patent
Ambs

(10) Patent No.: US 6,657,365 B1
(45) Date of Patent: Dec. 2, 2003

(54) HYBRID PIEZO-FILM CONTINUOUS LINE AND DISCRETE ELEMENT ARRAYS

(75) Inventor: Loran Ambs, Fulshear, TX (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 09/708,319

(22) Filed: Nov. 8, 2000

Related U.S. Application Data

(63) Continuation-in-part of application No. 09/584,440, filed on May 31, 2000, now abandoned.

(51) Int. Cl.⁷ .............................................. H01L 41/08
(52) U.S. Cl. ....................... 310/339; 310/324; 310/338; 310/800
(58) Field of Search ................................ 310/334, 324, 310/348, 338, 339, 800

(56) References Cited

U.S. PATENT DOCUMENTS

| | | | | |
|---|---|---|---|---|
| 3,832,580 A | * | 8/1974 | Yamamuro et al. | 310/337 X |
| 4,558,249 A | * | 12/1985 | Lerch et al. | 310/322 |
| 4,975,616 A | * | 12/1990 | Park | 310/339 |
| 5,406,163 A | * | 4/1995 | Carson et al. | 310/334 |
| 5,515,341 A | * | 5/1996 | Toda et al. | 367/140 |
| 5,517,467 A | * | 5/1996 | Fromont et al. | 310/800 X |
| 5,774,423 A | | 6/1998 | Pearce et al. | 367/157 |
| 5,883,857 A | | 3/1999 | Pearce | 367/20 |
| 5,956,292 A | * | 9/1999 | Bernstein | 367/140 |
| 5,982,708 A | | 11/1999 | Pearce | 367/157 |
| 6,108,274 A | | 8/2000 | Pearce | 367/157 |

FOREIGN PATENT DOCUMENTS

| | | |
|---|---|---|
| DE | 4322291 | 1/1995 |
| DE | 4339497 | 5/1995 |

OTHER PUBLICATIONS

Article titled: "High-Resolution Force Sensing by a Diode-Pumped ND:YAG Laser", Authors: Wolfgang Holzapfel and Martin Finnemann, Publication: Optics Letters, Date: Dec. 1, 1993, vol. 18, No. 23, pp. 2062–2064.

Article titled: "High-Resolution, Very Broadband Force Measurements by Solid-State Laser Transducers", Authors: Wolfgang Holzapfel, Stephan Neuschaefer-Rube and Michael Kobusch, Publication: Measurement, Date: Sep., 2000, vol. 28, pp. 277–291.

* cited by examiner

*Primary Examiner*—Mark Budd
(74) *Attorney, Agent, or Firm*—Madan, Mossman & Sriram, P.C.

(57) ABSTRACT

This present invention provides an array formed by a continous line array of piezoelectric film with discrete points of increased sensitivity to sense and measure acoustic signals. The configuration provided by the present invention simultaneously provides the advantages and attributes of both the continuous line array and the multi-element discrete array. The line array and the multi-element array are designed to enhance or cancel specific frequency bands of signal noise and to enhance beam forming of the array. The piezoelectric array can be extended and shaped into two-dimensional and three-dimensional hydrophone arrays. The present invention comprises a continuous line array formed by a single piece of piezoelectric film with one or more points of enhanced sensitivity to alter the beam pattern or spectral sensitivity of the array. The electrical output of the entire array may be observed with one set of connectors, one positive and one negative lead.

20 Claims, 4 Drawing Sheets

HYBRID PIEZO-FILM CONTINUOUS LINE AND DISCRETE ELEMENT ARRAYS

CROSS REFERENCE TO RELATED APPLICATIONS

This patent application is a continuation in part of patent application Ser. No., 09/584,440 filed on May 31, 2000, now abandoned, entitled "Continuous Seismic Receiver Array" by Loran D. Ambs and Ricky L. Workman, incorporated herein by reference.

BACKGROUND OF THE INVENTION

1. Field of the Invention

This present invention relates to a marine seismic hydrophone array formed by a continous line array of piezoelectric film of continuous extent with discrete points of increased sensitivity formed over sections of relatively compressible substrate. The invention is useful to acoustic arrays in general and may be used in air, water and other acoustic mediums.

2. Summary of Related Art

Marine seismic hydrophones are typically formed in seismic cables as a collection of associated receiver elements. The marine seismic hydrophone cables are towed behind a marine seismic vessel or deployed from a seismic vessel to rest on the bottom of the ocean. The marine seismic hydrophone cables are used for performing ocean borne and ocean bottom seismic surveys to determine the presence of hydrocarbon bearing formations beneath the surface of the ocean floor. Seismic surveyors utilize acoustic energy sources such as air guns to generate acoustic energy pulses that penetrate and acoustically probe subsurface geological formations. The seismic surveyor hydrophone cables include hydrophones and/or geophones for detecting acoustic energy generated by the seismic sources and reflected from subsurface formations. The characteristics of these acoustic pulse reflections enable seismic surveyors to determine the nature of the formations from which the reflections emanate.

The marine seismic survey cables typically comprise encapsulated hydrophone and/or geophone sub-arrays, comprising electrical conductors, fiber optic conductors for digital telemetry, seismic sensor wiring, and cable/hydrophone buoyancy materials. For towable seismic streamers, internal buoyancy fill materials are provided to increase buoyancy and overcome the relatively heavy internal components of the hydrophone cables. The hydrophone cable buoyancy material enable the seismic streamer cables to become neutrally or slightly negatively buoyant in water. Neutral buoyancy or slightly negative buoyancy, as desired, enables easier streaming through the water and/or deployment of the seismic hydrophone cable to the ocean bottom. Typically, a flexible water proof jacket surrounds the seismic hydrophone cables to exclude water from the interior components of the cable and reduce frictional drag to the cables as they are streamed through the water or deployed to the ocean bottom.

Towed seismic streamer hydrophone cables range up to twelve kilometers long. The seismic hydrophone cables are typically towed beneath the water surface to avoid the acoustic and mechanical noise produced by surface wave action and other such seismically detrimental environmental factors. The streamer elevation or depth beneath the surface of the water is selected for the associated water surface conditions, the water depth, and for the desired seismic data frequency content. Positional control over streamer elevation is critical to data quality, data frequency content and to the reflected seismic signals received by hydrophones which are incorporated into the seismic streamers.

Conventional seismic streamers are typically fluid filled. Seismic streamers and ocean bottom cables typically contain acoustic detectors such as piezoelectric crystal hydrophones. Each seismic streamer or ocean bottom cable is circular in cross section. The seismic acoustic signals are typically recorded from groups of point sensors connected together to form a subarray. Each sub-array typically comprises a plurality (e.g. fourteen) individual sensors, and the sub-array centers of sensors are typically spaced at 12.5 meter intervals along the cable. The hydrophone sensors are electrically grouped into sub-arrays to enhance the desired signal and to reduce undesirable noise.

Conventional hydrophones have used ceramic buttons as acoustic sensing elements. More recently piezoelectric films has been employed as the acoustic sensing element in seismic hydrophone cables. Piezoelectric film produces an electrical signal when stressed or strained under an impinging acoustic sound wave or other force, such as towing tension and compression. The sensitivity of the piezoelectric film material is anisotropic so that the magnitude of the response varies with the direction of the applied acoustic stress. For instance, the piezo-stress constant, g for electrical measurements made across the thickness of a PVDF piezoelectric film varies by about 50% depending on whether the stress is applied in the thickness (i.e. "3" direction) or length direction (i.e. "1" direction). For PVDF film, $g_{31}$ and $g_{33}$ are $216 \times 10^{-3}$ Vm/N and $-330 \times 10^{-3}$ Vm/N respectively. The relative differences in piezo-stress constant for other materials can be much greater. For copolymer film the ratio of $g_{31}/g_{33}$ is about 0.25. (Measurement Specialties Incorporated Technical Manual for Piezo-film Sensors, internet version updated August, 1998) The relative difference in piezo-stress constants of a film is further amplified by the way in which film is exposed to stress. Compared to a rigid-backed area of film exposed to pressure, the same film area exposed to the same pressure but backed by a compliant material may produce a signal more than 100 times as great. The rigid backed film produces a signal proportional to the thickness of the film. A compliant backed film produces a signal proportional to the span of film stretched. For PDVF, the piezo-stress constant for stress applied in the thickness direction is larger than that of the stretch direction but the length of material stretched is many times greater than the thickness and so the film is much more sensitive to stretch than to thinning. If a line array of rigidly backed piezo-film had small areas where the backing was compliant, the film stretched over those areas would have enhanced sensitivity to pressure.

U.S. Pat. No. 5,774,423, U.S. Pat. No. 5,982,708, U.S. Pat. No. 5,883,857 and U.S. Pat. No. 6,108,274 disclose a piezoelectric acoustic sensor having one or more segments that are electrically coupled to provide a response corresponding to an acoustic pressure applied to the segments. Another piezoelectric film acoustic sensor is described in U.S. Pat. No. 5,361,240 wherein a piezoelectric film is wrapped around a mandrel. A hollow space or void is formed between the piezoelectric film and the mandrel provides pressure compensation to permit activation of the film. Another piezoelectric film hydrophone was described in U.S. Pat. No. 5,774,423 where a flexible piezoelectric film was encapsulated with a segmented housing. Two or more clam-shell type housings were fastened to a cable to form a hydrophone. A hollow space was provided to permit flexure of the piezoelectric material, and multiple hydrophones assembled to form a seismic array.

Thus, there are no known piezoelectric hydrophones that provide for the combination of a discrete array component sensitivity in a continuous line array. Thus there is a need for a piezoelectric hydrophone that provides for the combination of discrete array component sensitivity in a continuous line array.

SUMMARY OF THE INVENTION

This present invention provides a hydrophone array formed by a continuous line array of piezoelectric film with discrete points of increased sensitivity. The configuration provided by the present invention simultaneously provides the advantages and attributes of both the continuous line array and the multi-element discrete array. The line array and the multi-element array are designed to enhance or cancel specific frequency bands of signal noise and to enhance beam forming of the array. The piezoelectric hydrophone array can be extended and shaped into two-dimensional and three-dimensional hydrophone arrays.

The present invention comprises a continuous line array formed by a single piece of piezoelectric film with one or more points of enhanced sensitivity to alter the beam pattern or spectral sensitivity of the array. The invention is useful to acoustic arrays in general and may be used in air, water and other acoustic mediums. The electrical output of the entire array may be observed with one set of connectors, one positive and one negative lead. The effect of changing the beam pattern and/or spectral sensitivity applies to two and three-dimensional array, for example, multi-armed star, circular planar array and cylindrical array.

DETAILED DESCRIPTION OF THE INVENTION

Figure 1:
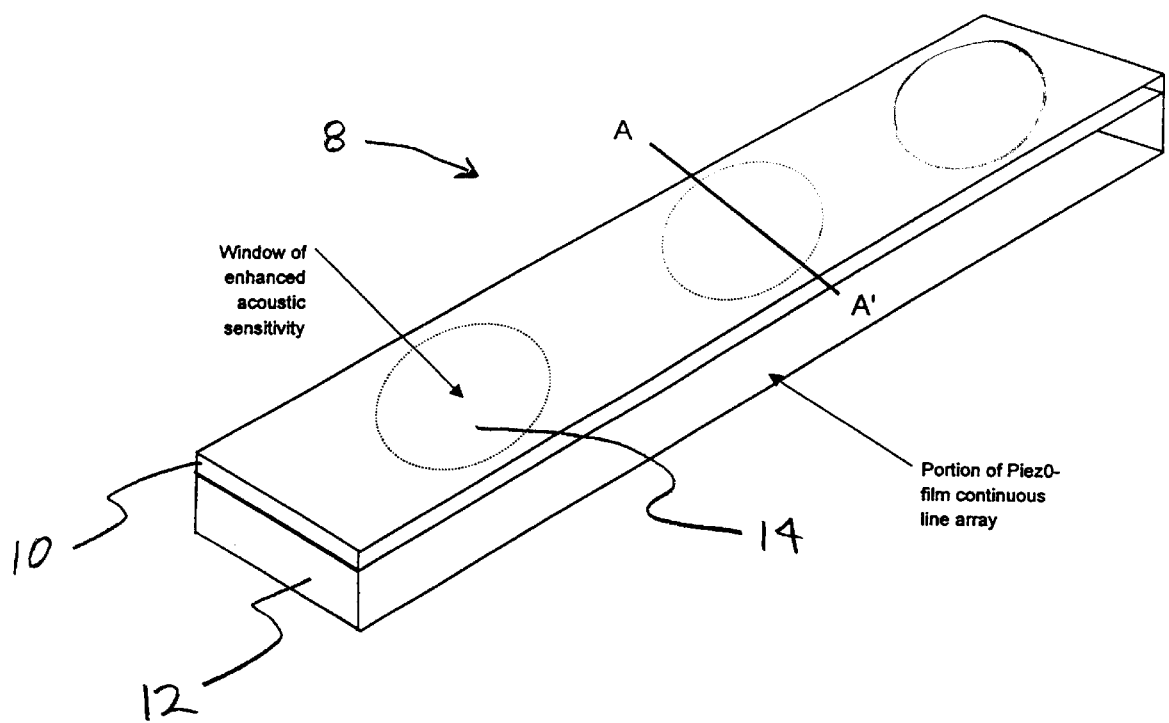
FIG. 1 is an orthographic view of a preferred embodiment of a hybrid piezoelectric film continuous line array and multi-element array of the present invention.

The present invention provides a structure for a hydrophone array formed by a continuous line array of piezoelectric film having discrete points of increased acoustic sensitivity. The invention is useful to acoustic arrays in general and may be used in air, water and other acoustic mediums. The present invention enables a continuous line array with discrete points of increased sensitivity by placing windows or sections of relatively compressible substrate adjacent the piezoelectric film in the relatively incompressible strata under the substrate of the piezoelectric film continuous line array. If the line array were backed only by the relatively incompressible substrate, the sensitivity of the array would substantively be due only to deformation or compression of the film in the thickness dimension, that is, in the $g_{33}$ mode. Thus, the output of the array without the increased sensitivity windows, which are coincident with the sections of relatively compressible substrate, would be a function of the $g_{33}$ sensitivity only, the pressure applied to the array and the thickness of the piezoelectric film.

In a preferred embodiment, the areas of enhanced sensitivity are created by substituting selected portions of the relatively incompressible substrate with a relatively compressible, more compliant material. The piezoelectric film spanning the section above the area of the compressible material produces an additional and increased electrical output when exposed to pressure. The compressible substrate enables the piezoelectric film adjacent the compressible substrate to deform and stretch under the pressure of the incident acoustic wave. Thus, the relatively compressible substrate enables the piezoelectric film to generate an additional electrical signal that is dependent upon the $g_{31}$, the stretch direction.

The sensitivity of the piezoelectric film in the stretch direction is dependent upon the acoustic pressure scalar and the degree of compressibility and the area of the film backed by relatively compressible material. The magnitude of sensitivity in the thickness and stretch directions are relatively equal in magnitude, or at least within a factor of 2 or three of each other. The magnitude of the electrical output of the piezoelectric film in the stretch direction has the potential to be much larger than electrical output of the piezoelectric film in the compression dimension, since the dimension of the piezoelectric film being stretched is so much greater than the thickness of the film (i.e. centimeters versus micrometers). Thus, the amplitude of the electrical response to an acoustic signal in the areas adjacent the relatively compressible substrate is potentially three orders of magnitude greater than the amplitude of the electrical response of the piezoelectric film over the relatively incompressible substrate.

In the preferred embodiment, an acoustic line array is formed from a continuous strip of piezoelectric film over a variable compressibility substrate that enables formation of an acoustic array that has attributes of a continuous line array and of a multi-element line array. This continuous line array response enables the shaping and modification of acoustically sensitive elements by forming and shaping locations of heightened sensitivity, adjacent discrete areas or relatively compressible substrate along the array of piezoelectric film. The contribution of continuous line array response and multi-element array response is varied by designing the shapes and configuration of the discrete heightened sensitivity areas in the array to obtained the desired array response. Thus, the present invention enables enhanced array beam forming, spectral sensitivity control and noise reduction.

In a preferred embodiment a hybrid line array is formed over a rod shaped substrate. Points of enhanced sensitivity along the array are created by axial symmetric thinning of the substrate material filled with compliant materials and covered by piezoelectric film. Unlike prior piezoelectric hydrophones which provide a single sensor formed by two segments or pieces of piezoelectric film at each sensor location, the present invention provides a sensor formed by one continuous piece of piezoelectric film. The single piece of piezoelectric film of the present invention can be used to cover a window formed in the substrate filled with a relatively compressible material, air or some other material to achieve the desired acoustic and mechanical properties.

The present invention incorporates the method of rejecting common mode signals created by stretching or deformation in the stretch direction, as described by patent application serial number, 09/584,440 filed on May 31, 2000, entitled "Continuous Seismic Receiver Array" by Loran D. Ambs and Ricky L. Workman, incorporated herein by reference.

The piezoelectric film used to make the preferred array can be applied to a cable in various ways, for example, the piezoelectric film can be made as a ribbon, as a longitudinal stripe on a cable, as multiple radial wraps on a cable, as helical wraps around a cable or rolled into a cylinder.

Turning now to FIG. 1, an orthographic view of the piezoelectric film hydrophone array of the preferred embodiment is illustrated. As shown in FIG. 1, a portion of a preferred hybrid piezoelectric film continuous line array and multi-element array 8 is shown. Piezoelectric film 10 is placed on the stiff, relatively incompressible substrate 12. Windows 14 or sections of enhance acoustic sensitivity, adjacent relatively compressible substrate 16, are shown along piezoelectric film 10. The shape and size of the windows 14 can be varied so that each window is the same size or the size of the windows can be varied relative to each other to enable variance of the sensitivity of each discrete element relative to the other discrete elements. The total surface area relative to the incompressible surface area and the spacing of the discrete increased sensitivity area are varied as desired to form the desired response of the array.

Figure 2:
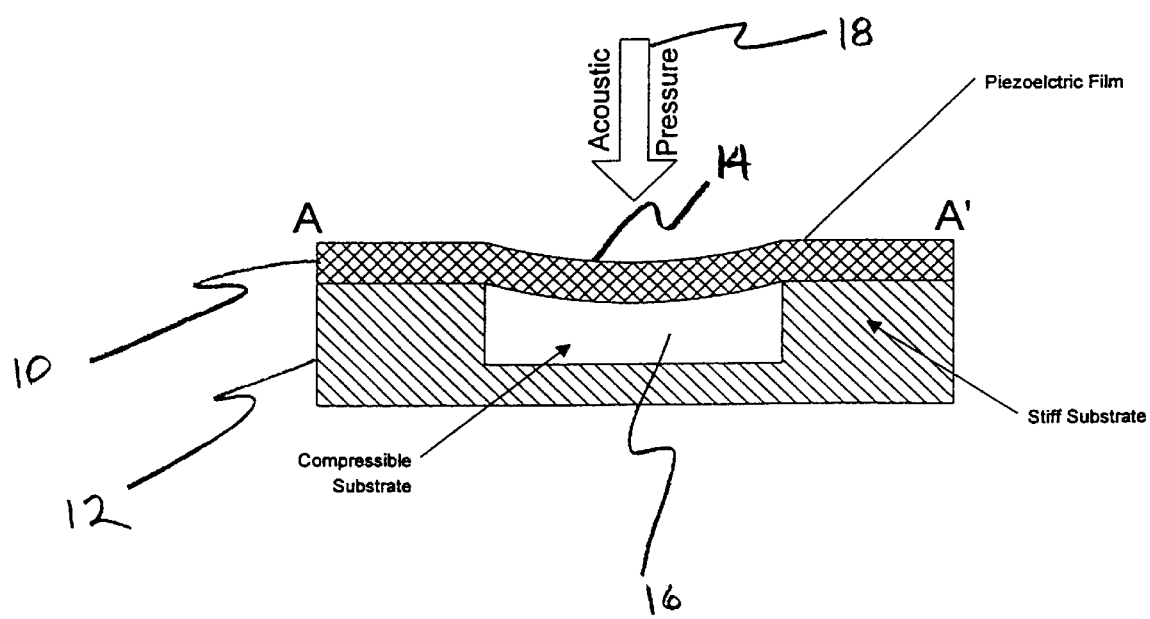
FIG. 2 is a cross section of a preferred embodiment of a hybrid piezoelectric film continuous line array and multi-element array of the present invention.

Turning to FIG. 2, a cross section of the preferred hybrid piezoelectric film continuous line array and multi-element array 8 is shown. The windows 14 of enhanced acoustic sensitivity are coincident with areas of the relatively compressible substrate 16, as shown in FIG. 2. The windows 14 of enhanced acoustic sensitivity over the relatively compressible substrate are more sensitive to acoustic pressure waves 18 impinging on the piezoelectric film than the areas of piezoelectric film over the relatively incompressible substrate.

Figure 3:
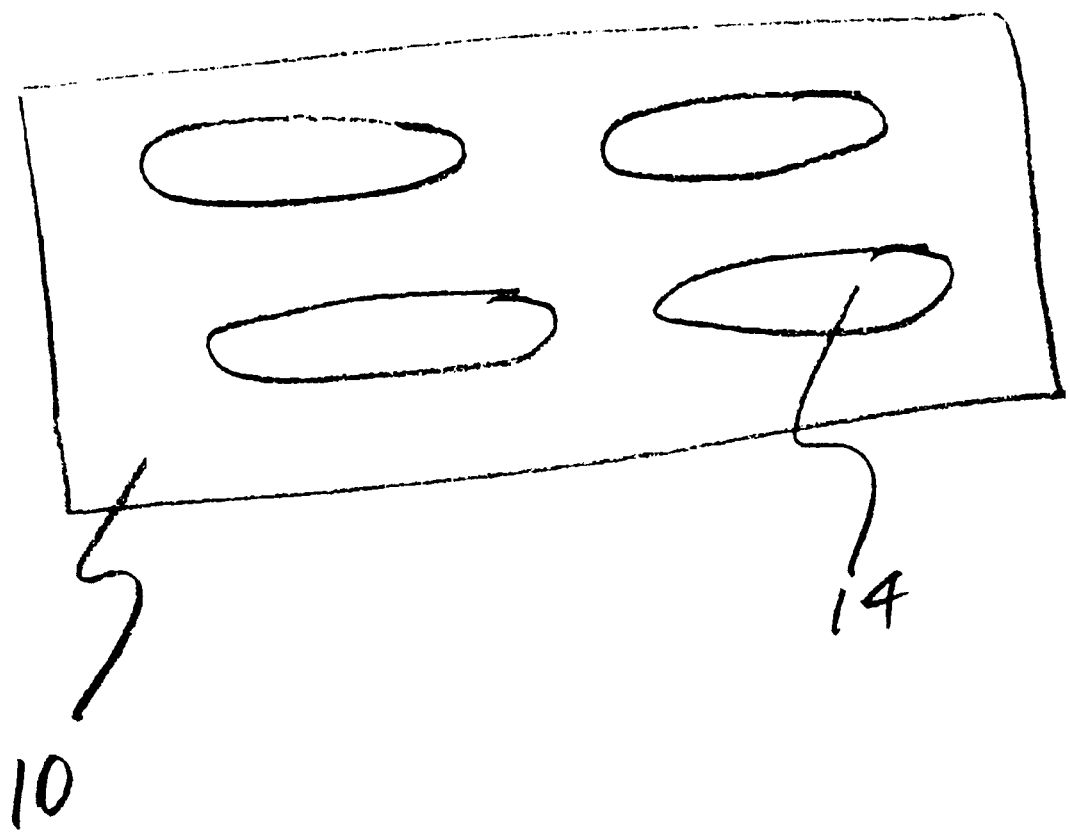
FIG. 3 is a side view of a two-dimensional alternative embodiment of a hybrid piezoelectric film continuous line array and multi-element array of the present invention.
Figure 4:
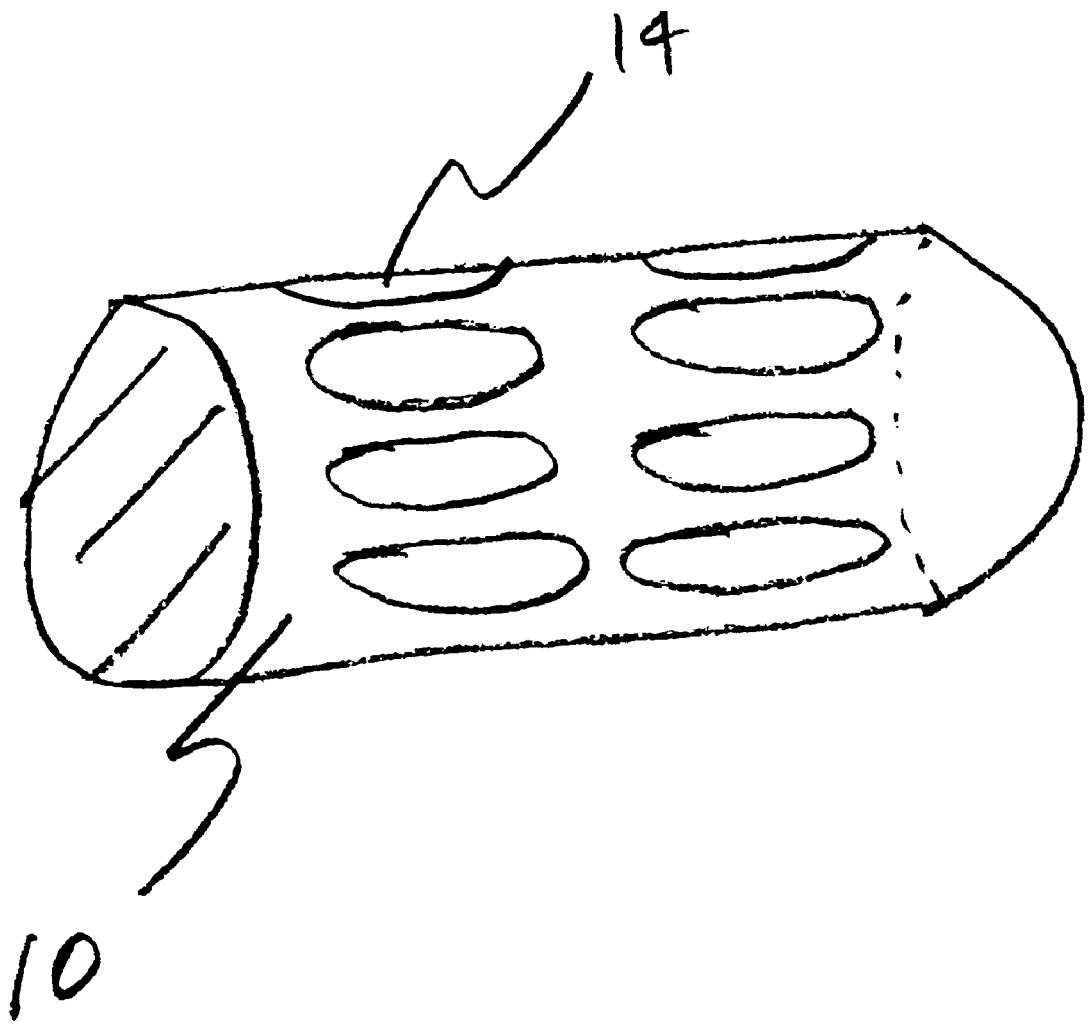
FIG. 4 is a side view of a three-dimensional alternative embodiment of a hybrid piezoelectric film continuous line array and multi-element array of the present invention.

Turning now to FIG. 3, an example of a two-dimensional array is illustrated. The areas of increased sensitivity 14 in FIG. 3 are arranged side by side to form a two-dimensional array on top of the substrate. Turning now to FIG. 4, an example of a three-dimensional array is illustrated. The areas of increased sensitivity in FIG. 4 are arranged side by side and formed into a cylinder to form a three-dimensional array on top of the substrate.

The shape and size of the areas of increased sensitivity can be varied to enhance beam pattern formation, noise reduction and other advantages of continuous line arrays and discrete element arrays. The piezoelectric array of the present invention can be shaped into virtually any desired shape to reduce noise or to achieve a desired beam pattern shape or response for the array. The compressibility and or shape and relative size of each discrete section can be varied to achieve the desired noise reduction and/or array beam pattern.

While a preferred embodiment of the present invention has been described herein, it is for illustration purposes and not intended to limit the scope of the invention as defined by the following claims.

What is claimed is:

1. A single element piezoelectric sensor for detecting acoustic seismic data comprising:
    a continuous uninterrupted piezoelectric film forming a single piezoelectric element placed on a surface of a relatively incompressible substrate, wherein the piezoelectric film adjacent the relatively incompressible substrate generates an electrical signal substantially sensitive to compression of the piezoelectric film only;
    a plurality of areas of relatively compressible substrate formed in the surface of the relatively incompressible substrate adjacent areas within the continuous uninterrupted piezoelectric film, wherein the area plurality of areas within the continuous uninterrupted piezoelectric film adjacent the areas of relatively compressible substrate generate an electrical signal substantially sensitive to stretching of the piezoelectric film adjacent the relatively compressible substrate ;and
    a single electrical output from the single piece of piezoelectric film.

2. The piezoelectric sensor of claim 1 further comprising:
    a plurality of areas of relatively compressible substrate formed in the surface of the relatively incompressible substrate forming a continuous line array of discrete areas of increased sensitivity in the piezoelectric film to impinging acoustic pressure waves
    a beam pattern for the sensor determined by the relationship between the shapes and configuration of the areas relatively incompressible substrate and the areas of relatively compressible substrate adjacent the single piece of piezoelectric film.

3. The piezoelectric sensor of claim 1, further comprising:
    a two-dimensional array of areas of relatively compressible substrate formed in the surface of the relatively incompressible substrate forming a two-dimensional continuous line array of areas of increased sensitivity in the piezoelectric film to impinging acoustic pressure waves.

4. The piezoelectric sensor of claim 3, further comprising:
    the two-dimensional continuous line array of areas of increased sensitivity are formed into a three-dimensional shape to form a three-dimensional continuous line array of areas of increased sensitivity to impinging acoustic pressure waves in the piezoelectric film.

5. The piezoelectric sensor of claim 2 further comprising:
    variation in at least one of a size and location of the areas of increased sensitivity to shape the beam pattern of the piezoelectric continuous line array.

6. The piezoelectric sensor of claim 2 further comprising:
    variation in at least one of a size and location of the areas of increased sensitivity to shape the spectral response of the piezoelectric continuous line array.

7. The piezoelectric sensor of claim 2 further comprising:
    variation in a ratio of the total surface area of the areas of increased sensitivity to the total surface area of the relatively incompressible substrate to shape the beam pattern of the piezoelectric continuous line array.

8. The piezoelectric sensor of claim 2 further comprising:
    variation in a ratio of the total surface area of the areas of increased sensitivity to the total surface area of the relatively incompressible substrate are varied to determine the spectral response of the piezoelectric continuous line array.

9. The piezoelectric sensor of claim 1 further comprising:
    wherein the piezoelectric film adjacent the areas of relatively compressible substrate generate an electrical signal substantially larger than the piezoelectric film adjacent the areas of relatively incompressible substrate.

10. The piezoelectric sensor of claim 3 further comprising:
    a shape of the continuous line array formed to determine the spectral response of the continuous line array.

11. A method for detecting acoustic seismic data on a single element piezoelectric sensor comprising:

placing a continuous piece of uninterrupted piezoelectric film forming a single piezoelectric element on a surface of a relatively incompressible substrate, wherein the piezoelectric film adjacent the relatively incompressible substrate generates an electrical signal substantially sensitive to compression of the piezoelectric film only;

forming a plurality of areas of relatively compressible substrate formed in the surface of the relatively incompressible substrate adjacent areas within the continuous uninterrupted piezoelectric film, wherein the area plurality of areas within the continuous uninterrupted piezoelectric film adjacent the areas of relatively compressible substrate generate an electrical signal substantially sensitive to stretching of the piezoelectric film adjacent the relatively compressible substrate; and connecting a single electrical output from the single piece of piezoelectric film forming the plurality of discrete areas of increased sensitivity.

12. The method of claim 11 further comprising:

forming a beam pattern for the sensor by adjusting the relationship between the shapes and configuration of the areas relatively incompressible substrate and the areas of relatively compressible substrate adjacent the single piece of piezoelectric film.

13. The method of claim 11, further comprising:

forming a two-dimensional array of areas of relatively compressible substrate formed in the surface of the relatively incompressible substrate to create a two-dimensional continuous line array of areas of increased sensitivity in the piezoelectric film to impinging acoustic pressure waves.

14. The method of claim 13, further comprising:

forming the two-dimensional continuous line array of areas of increased sensitivity into a three-dimensional shape to form a three-dimensional continuous line array of areas of increased sensitivity to impinging acoustic pressure waves in the piezoelectric film.

15. The method of claim 12 further comprising:

varying a size or location of an area of increased sensitivity to shape the beam pattern of the piezoelectric continuous line array.

16. The method of claim 12 further comprising:

varying a size or location of an area of increased sensitivity to shape the spectral response of the piezoelectric continuous line array.

17. The method of claim 12 further comprising:

varying a ratio of the total surface area of the areas of increased sensitivity to the total surface area of the relatively incompressible substrate to shape the beam pattern of the piezoelectric continuous line array.

18. The method of claim 12 further comprising:

variation in a ratio of the total surface area of the areas of increased sensitivity to the total surface area of the relatively incompressible substrate are varied to determine the spectral response of the piezoelectric continuous line array.

19. The method of claim 12 further comprising:

wherein the piezoelectric film adjacent the areas of relatively compressible substrate generate an electrical signal substantially larger than the piezoelectric film adjacent the areas of relatively incompressible substrate.

20. The method of claim 13 further comprising:

shaping of the areas forming the continuous line array to determine the spectral response of the continuous line array.

* * * * *